(12) United States Patent
Nagata et al.

(10) Patent No.: US 8,211,526 B2
(45) Date of Patent: Jul. 3, 2012

(54) HONEYCOMB STRUCTURE

(75) Inventors: Koji Nagata, Nagoya (JP); Toshio Yamada, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 199 days.

(21) Appl. No.: 12/711,617

(22) Filed: Feb. 24, 2010

(65) Prior Publication Data

US 2010/0239812 A1    Sep. 23, 2010

(30) Foreign Application Priority Data

Mar. 19, 2009  (JP) ................. 2009-068393

(51) Int. Cl.
*B32B 3/12* (2006.01)
*B01D 50/00* (2006.01)
*B01D 53/34* (2006.01)

(52) U.S. Cl. ........ 428/116; 428/117; 422/177; 422/180; 422/181; 422/182

(58) Field of Classification Search .................. None
See application file for complete search history.

(56) References Cited

U.S. PATENT DOCUMENTS

| 2004/0045267 A1 | 3/2004 | Ichikawa et al. |
| 2005/0166729 A1 | 8/2005 | Nishio et al. |
| 2006/0019061 A1 | 1/2006 | Oshimi |
| 2006/0191245 A1 | 8/2006 | Bardon |

FOREIGN PATENT DOCUMENTS

| EP | 1 591 431 A1 | 11/2005 |
| EP | 2 236 481 A2 | 10/2010 |
| ER | 1 884 275 A1 | 2/2008 |
| ET | 1 977 808 A1 | 10/2008 |
| FR | 2 857 695 A1 | 1/2005 |
| JP | 2003-117322 | 4/2003 |
| JP | 2003-291054 | 10/2003 |

OTHER PUBLICATIONS

U.S. Appl. No. 12/711,596, filed Feb. 24, 2010, Yamada et al.
Extended European Search Report mailed Sep. 2, 2011.

*Primary Examiner* — Gordon R Baldwin
(74) *Attorney, Agent, or Firm* — Burr & Brown

(57) ABSTRACT

There is provided a honeycomb structure including a plurality of honeycomb segments having porous partition walls separating and forming a plurality of cells functioning as fluid passages and an outer peripheral wall located in the outermost periphery. The first cells open in an end portion on one side and plugged in the other end portion on the other side and the second cells plugged in the end portion on the one side and open in the other end portion on the other side are alternately disposed. The first cells have an area larger than that of the second cells in a cross section perpendicular to the central axial direction. The outer peripheral wall has protruding portions along an external shape of the first cells and depressed portions along an external shape of the second cells. The honeycomb segments are bonded together with a bonding member.

4 Claims, 5 Drawing Sheets

HONEYCOMB STRUCTURE

BACKGROUND OF THE INVENTION

The present invention relates to a honeycomb structure, more specifically, to a honeycomb structure capable of inhibiting a honeycomb segment from being detached from a bonding member when combustion of trapped particulate matter (regeneration) is repeated and capable of inhibiting the honeycomb structure to be separated.

A ceramic honeycomb structure excellent in thermal resistance and corrosion resistance is employed as a carrier for a catalytic device or a filter used for an environmental measure, collection of a specific material or the like in various fields such as chemistry, electric power, and iron and steel. In particular, recently, a honeycomb structure plugged alternately in cell open portions on both the end faces as a plugged honeycomb structure is frequently used as a diesel particulate filter (DPF) for trapping particulate matter (PM) discharged from a diesel engine or the like. As a material for the honeycomb structure used in a high temperature corrosive gas atmosphere, silicon carbide (SiC), cordierite, aluminum titanate (AT), and the like, which are excellent in thermal resistance and chemical stability, are suitably used.

Since silicon carbide has relatively large thermal expansion coefficient, a honeycomb structure formed by the use of silicon carbide as the framework may cause a defect due to thermal shock upon use if the size is large. In addition, a defect may be caused due to thermal shock upon combusting and removing trapped particulate matter. Therefore, in the case of manufacturing a honeycomb structure using silicon carbide as the framework and having a predetermined or larger size, generally, a plurality of small plugged honeycomb structured segments are manufactured, and then they are bonded together to obtain one large bonded article. The outer periphery of the bonded article is subjected to coarse machining and grinding to obtain a plugged honeycomb structure having a desired shape such as a cylindrical shape (see, e.g., JP-A-2003-291054). The bonding of the segments is performed by the use of a bonding material, which is applied on a side face (outer peripheral wall) of a predetermined segment, and a plurality of segments are bonded together at the side faces to obtain a honeycomb structure where a plurality of segments are bonded by means of the bonding member (see, e.g., JP-A-2003-117322).

Such a honeycomb structure formed by bonding honeycomb segments with a bonding material (bonding member) at side faces thereof has a problem of detachment of a honeycomb segment from the bonding member due to repeated heating and cooling when combustion of trapped particulate matter (regeneration) is repeated to sometimes cause separation of the honeycomb structure.

SUMMARY OF THE INVENTION

The present invention has been made in view of the aforementioned problems and aims to provide a honeycomb structure capable of inhibiting detachment of a honeycomb segment from the bonding member and capable of inhibiting separation of the honeycomb structure when combustion of trapped particulate matter (regeneration) is repeated.

In order to solve the above problems, the present invention provides the following honeycomb structures.

[1] A honeycomb structure comprising a plurality of honeycomb segments having porous partition walls separating and forming a plurality of cells functioning as fluid passages and an outer peripheral wall located in the outermost periphery, the cells including first cells each open in an end portion on one side and plugged in the other end portion on the other side and second cells each plugged in the end portion on the one side and open in the other end portion on the other side, and the first cells and the second cells being alternately disposed with the first cells having an area larger than that of the second cells in a cross section perpendicular to the central axial direction; wherein the outer peripheral wall has protruding portions along an external shape of the first cells and depressed portions along an external shape of the second cells, and the honeycomb segments are disposed with side faces thereof facing each other and bonded to each other with a bonding member at the side faces facing each other.

[2] The honeycomb structure according to [1], wherein the protruding portions of the outer peripheral wall has a height of 0.1 to 1.0 mm based on the depressed portions of the outer peripheral wall.

[3] The honeycomb structure according to [1] or [2], wherein, in a pair of outer peripheral walls facing each other of adjacent honeycomb segments, the distance from the depressed portion of one of the outer peripheral walls to the depressed portion of the other peripheral wall is 0.3 to 3.0 mm.

According to a honeycomb structure of the present invention, since the outer peripheral wall of each honeycomb segment has protruding portions along the external shape of the first cells and depressed portions along the external shape of the second cells, the contact area between the outer peripheral wall of the honeycomb segment and the bonding member in contact with the honeycomb segment is large, thereby increasing bonding strength between the honeycomb segment and the bonding member. This can inhibit detachment of the honeycomb segment from the bonding member even if tensile stress and compression stress are alternately applied to the honeycomb segment and the bonding member due to repeated regeneration and can inhibit separation of the honeycomb structure.

REFERENCE NUMERALS

1: cell, 1a: first cell, 1b: second cell, 2: partition wall, 3: outer peripheral wall, 3a: protruding portion, 3b: depressed portion, 4, 22, 32: honeycomb segment, 5: side face, 6: plugging portion, 11: bonding member, 12: outer peripheral portion, 21, 31, 41: honeycomb formed article, 100, 101, 102, 103: honeycomb structure, A: region (region including four honeycomb segments), H: height of protruding portion, D1: di stance between protruding portions, D2: distance between depressed portions, W1: width of the first cell, W2: width of the second cell, t1: thickness of partition wall, t2: thickness of slanted partition wall, T1: partition wall thickness of protruding portion, T2: partition wall thickness of depressed portion, T3: thickness of outer peripheral slanted partition wall

DETAILED DESCRIPTION OF THE INVENTION

Next, embodiments of the present invention will be described in detail with referring to drawings. However, the present invention is by no means limited to the following embodiments, and it should be understood that changes, improvements, and the like of the design can appropriately be made on the basis of general knowledge of a person of ordinary skill in the art within the range of not deviating from the gist of the present invention.

Figure 1:
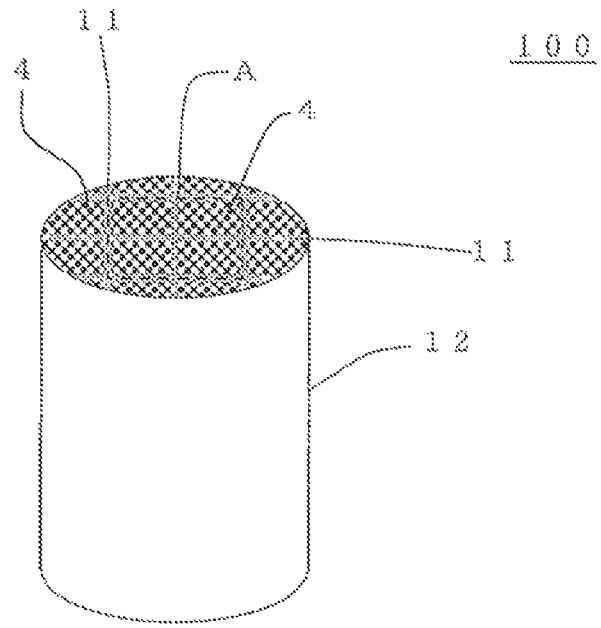
FIG. 1 is a perspective view schematically showing an embodiment of a honeycomb structure of the present invention.
Figure 2:
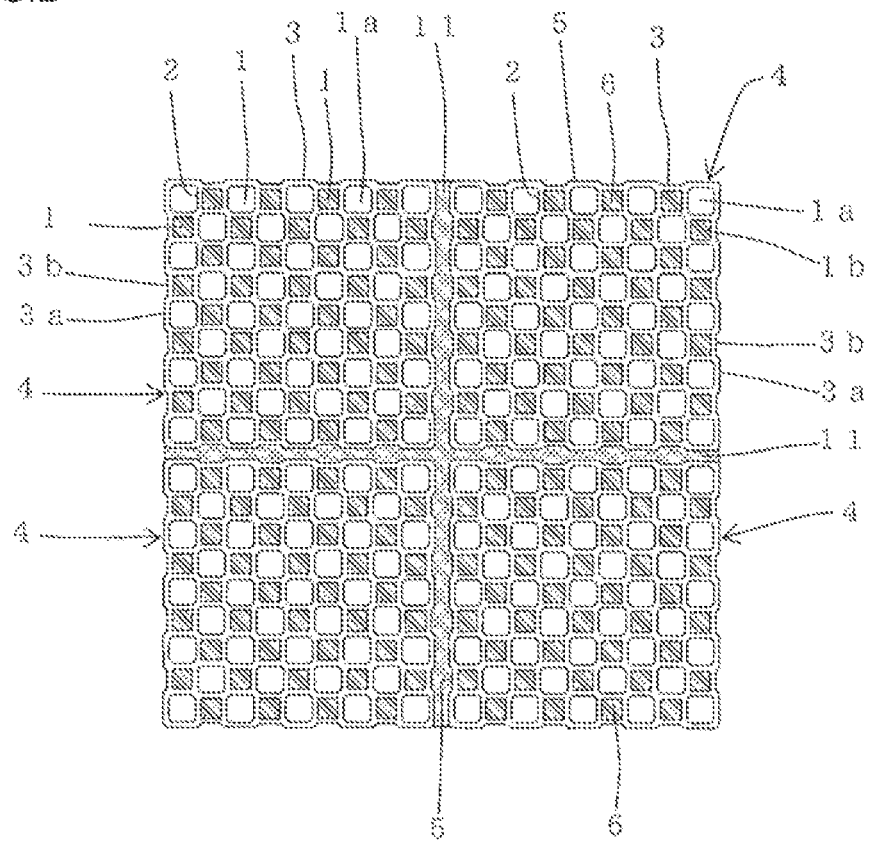
FIG. 2 is an enlarged plan view schematically showing the region A of FIG. 1.

As shown in FIGS. 1 and 2, one embodiment of a honeycomb structure of the present invention is provided with a plurality of honeycomb segments 4 having porous partition walls 2 separating and forming a plurality of cells 1 functioning as fluid passages and an outer peripheral wall 3 located in the outermost periphery. The first cells 1a open in an end portion on one side and plugged in the other end portion on the other side and the second cells 1b plugged in the end portion on the one side and open in the other end portion on the other side are alternately disposed with the first cells 1a having an area larger than that of the second cells 1b in a cross section perpendicular to the central axial direction. The outer peripheral wall 3 has protruding portions 3a along an external shape of the first cells 1a and depressed portions 3b along an external shape of the second cells 1b. The honeycomb segments 4 are disposed with side faces 5 thereof facing each other and bonded to each other with a bonding member 11 at the side faces 5 facing each other. FIG. 1 is a perspective view schematically showing an embodiment of a honeycomb structure of the present invention. FIG. 2 is an enlarged plan view schematically showing the region A of FIG. 1. FIG. 2 is a plan view showing one end face side of four adjacent honeycomb segments among the honeycomb segments constituting the honeycomb structure of the present embodiment. The one end face side of the honeycomb segments is the one end portion side of each cell.

Thus, since a portion along the external shape of the first cell of the outer peripheral wall of each honeycomb segment is formed in a protruding shape, and a portion along the external shape of the second cell of the outer peripheral wall of each honeycomb segment is formed in a depressed shape to increase the contact area between the outer peripheral wall of the honeycomb segment and the bonding member in contact with the outer peripheral wall, bonding strength between the honeycomb segment and the bonding member is increased. Therefore, even when tensile stress and compression stress are alternately applied on the honeycomb segment and the bonding member due to repeated regeneration, detachment of the honeycomb segment from the bonding member can be inhibited, and separation of the honeycomb structure is inhibited.

Figure 3:
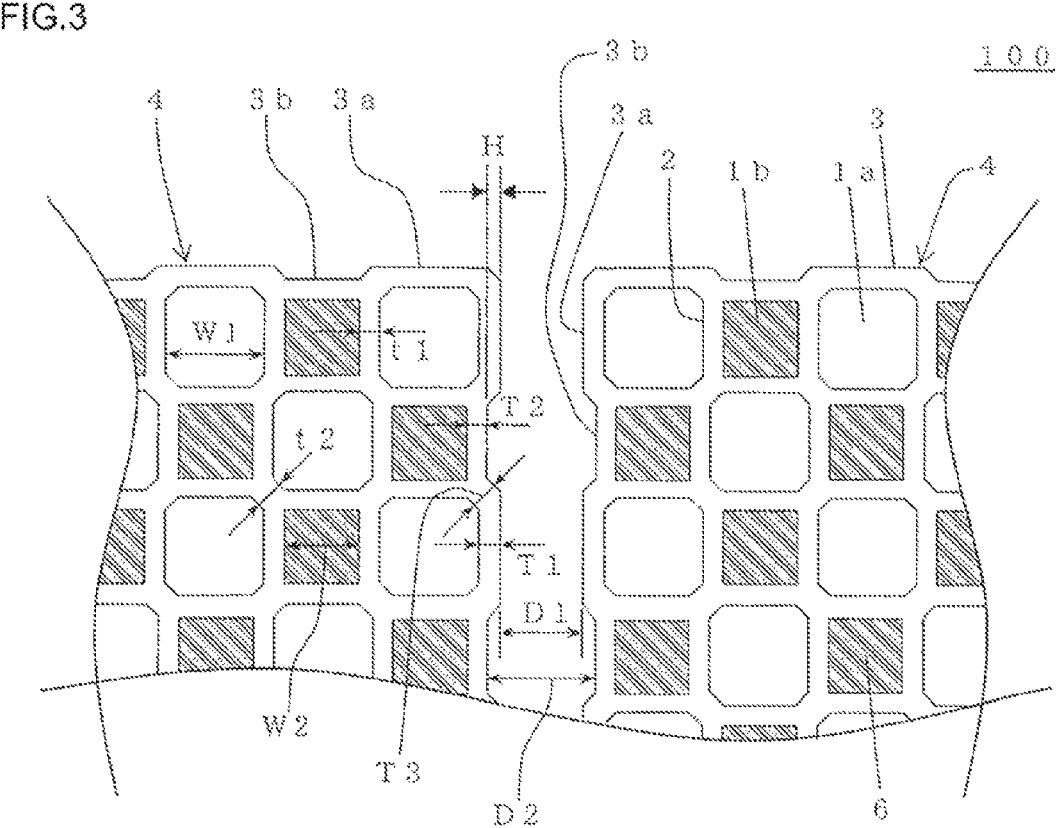
FIG. 3 is an enlarged plan view schematically showing a part on one end face side of an embodiment of a honeycomb structure of the present invention.

In the honeycomb structure 100 of the present embodiment, the height H (see FIG. 3) of the protruding portions 3a of the outer peripheral wall 3 based on the depressed portions 3b of the outer peripheral wall 3 is preferably 0.1 to 1.0 mm, more preferably 0.3 to 0.8 mm. Such a range of the height H of the protruding portions 3a enables to increase the bonding strength between the honeycomb segment and the bonding member. When the height H of the protruding portions 3a is smaller than 0.1 mm, the effect in increasing the bonding strength between the honeycomb segment and the bonding member may decrease. When the height H of the protruding portions 3a is larger than 1.0 mm, since attention has to be paid to deformation or the like of the honeycomb segment upon forming and firing, productivity may be deteriorated. FIG. 3 is a plan view schematically showing an enlarged part on one end face side of an embodiment of a honeycomb structure of the present invention. Incidentally, in FIG. 3, the bonding member is omitted.

In the honeycomb structure 100 of the present embodiment, the distance (distance between two depressed portions 3b, 3b) D2 from the depressed portion (depressed portion) of one outer peripheral wall to the depressed portion (depressed portion) of the other peripheral wall is preferably 0.3 to 3.0 mm, more preferably 0.9 to 2.4 mm. When D2 is below 0.3 mm, productivity may be deteriorated because control of the thickness of the bonding material is hard upon assembling the honeycomb segments. When D2 is above 3.0 mm, productivity may be deteriorated because control of the thickness of the bonding material is hard upon assembling the honeycomb segments, and pressure loss may tend to increase. The "distance D2 from the depressed portion of an outer peripheral wall on one side to the depressed portion of the outer peripheral wall on the other side" is length of a perpendicular line from the depressed portion of the outer peripheral wall on the one side to the depressed portion of the outer peripheral wall on the other side. Therefore, even in the case that the depressed portion of the outer peripheral wall on the one side does not face the depressed portion of the outer peripheral wall on the other side with having a slippage, the distance D2 means length of the perpendicular line drawn from the depressed portion of the outer peripheral wall on the other side to an extension line of depressed portion of the'outer peripheral wall on the one side.

In addition, in the honeycomb structure 100 of the present embodiment, in a pair of the outer peripheral walls 3 and 3 facing each other of adjacent honeycomb segments 4, the distance D1 between the protruding portions 3a and 3a is preferably 0.1 to 1.0 mm, more preferably 0.3 to 0.8 mm. When the distance D1 between the protruding portions 3a and 3a is below 0.1 mm, the bonding member deforms due to stress upon regeneration to cause collision of the outer peripheral walls with each other. When it is above 1.0 mm, pressure loss upon passing exhaust gas through the honeycomb structure may increase. The "distance between the protruding portions 3a and 3a" is length of the perpendicular line from the protruding portion of the outer peripheral wall on one side to the protruding portion of the other outer peripheral wall on the other side. In addition, the distance D2 between the depressed portions 3b and 3b (distance between the depressed portion 3b and the other depressed portion 3b) is shown by a value obtained by adding twice the height H to D1.

Figure 7:
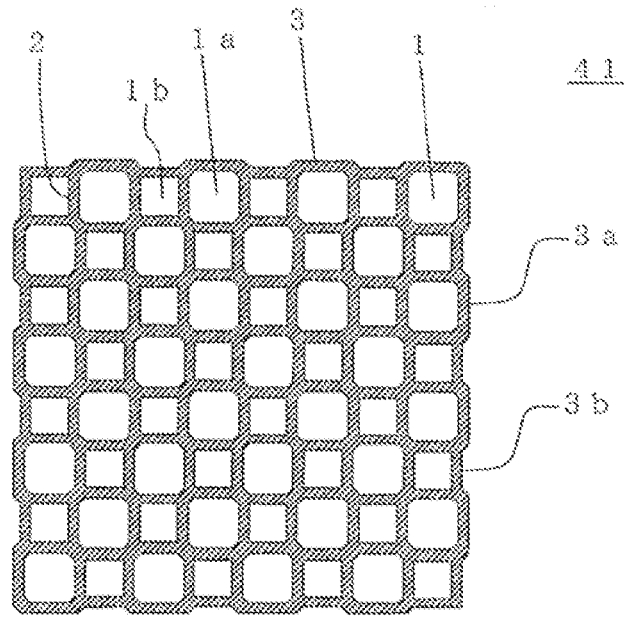
FIG. 7 is a schematic view showing a cross section perpendicular to a central axial direction of a columnar honeycomb formed article manufactured in the process for manufacturing another embodiment of a honeycomb structure of the present invention.
Figure 8:
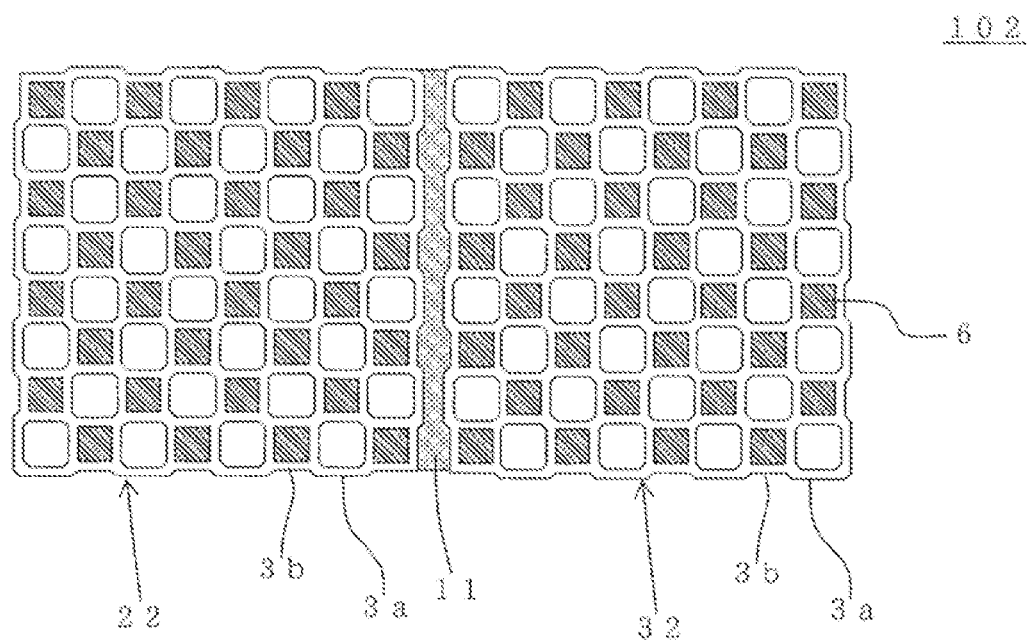
FIG. 8 is a plan view schematically showing a part of one end face on one side of another embodiment of a honeycomb structure of the present invention.
Figure 9:
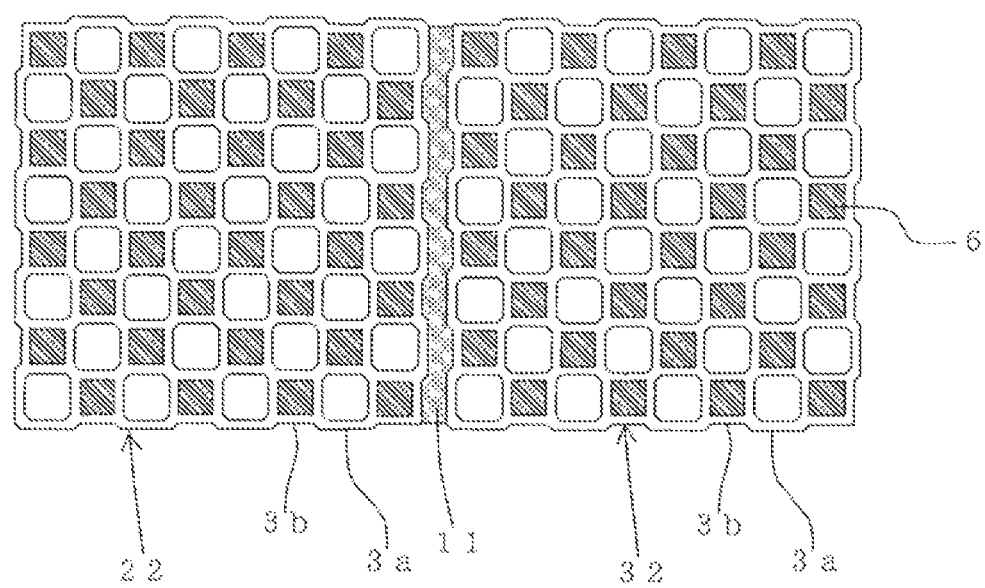
FIG. 9 a plan view schematically showing a part of one end face on one side of still another embodiment of a honeycomb structure of the present invention.

In the honeycomb structure 100 of the present embodiment, as shown in FIG. 2, in adjacent honeycomb segments 4, the protruding portions face each other, and the depressed portions face each other. Also, in the honeycomb structure 102 shown in FIG. 8, in adjacent honeycomb segments 4, protruding portions face each other, and depressed portions face each other. Thus, it is preferable that the protruding portions face each other and that the depressed portions face each other in adjacent honeycomb segments 4 in a honeycomb structure of the present invention. However, as the honeycomb structure 101 shown in FIG. 6 or the honeycomb structure 103 shown in FIG. 9, it is also a preferable embodiment that a protruding portion 3a of a honeycomb segment 22 faces a depressed portion 3b of the adjacent honeycomb segment 32. In comparison with the honeycomb structure 101 shown in FIG. 6, the honeycomb structure 103 shown in FIG. 9 has an advantage of being constituted by honeycomb segments having a shape of only one kind. The honeycomb structure 102 shown in FIG. 8 and the honeycomb structure 103 shown in FIG. 9 can be formed by the use of the honeycomb formed article 41 shown in FIG. 7. FIG. 7 is a schematic view showing a cross section perpendicular to a central axial direction of a columnar honeycomb formed article manufactured in the process for manufacturing another embodiment of a honeycomb structure of the present invention. FIG. 8 is a plan view schematically showing a part of one end face on one side of another embodiment of a honeycomb structure of the present invention. FIG. 9 is a plan view schematically showing a part of one end face on one side of still another embodiment of a honeycomb structure of the present invention. It is preferable that the constituents of each of the honeycomb structure 102 shown in FIG. 8 and the honeycomb structure 103 shown in FIG. 9 are the same as those of an embodiment of a honeycomb structure of the present invention except that the shape of the outer peripheral wall of each honeycomb segment is different.

A material for constituting the honeycomb structure of the present embodiment is preferably ceramic, more preferably at least one kind selected from the group consisting of silicon carbide, a silicon-silicon carbide based composite material, cordierite, mullite, alumina, spinel, a silicon carbide-cordierite based composite material, lithium aluminum silicate, aluminum titanate, and an iron-chrome-aluminum based alloy because of excellent strength and thermal resistance. Of these, silicon carbide or a silicon-silicon carbide based composite material is particularly preferable. Since silicon carbide has relatively large thermal expansion coefficient, a honeycomb structure formed by the use of silicon carbide as the framework may cause a defect due to thermal shock upon use if the size is large. However, in a honeycomb structure of the present invention, since a plurality of honeycomb segments are disposed adjacently in such a manner that side faces thereof face each other and are bonded together with a bonding member, stress due to thermal expansion of silicon carbide is relaxed by the bonding member, and generation of a defect in the honeycomb structure can be inhibited.

The honeycomb segment (partition walls constituting the honeycomb segment) constituting a honeycomb structure of the present embodiment is preferably porous. The porosity of the honeycomb segment is 30 to 80%, preferably 40 to 65%. The porosity in such a range enables to decrease pressure loss while maintaining strength. When the porosity is below 30%, pressure loss may increase. When the porosity is above 80%, the strength and the thermal conductivity may be lowered. The porosity is a value obtained by measurement using a mercury porosimeter.

The honeycomb segment constituting a honeycomb structure of the present embodiment has a mean pore size of preferably 5 to 50 μm, more preferably 7 to 35 μm. The mean pore size in such a range enables to effectively trap particulate matter (PM). When the mean pore size is below 5 μm, clogging may be caused due to the particulate matter (PM). When the mean pore size is above 50 μm, particulate matter (PM) may pass through the filter without being trapped. The mean pore diameter is a value obtained by measurement using a mercury porosimeter.

In the case that the material for the honeycomb segment constituting the honeycomb structure of the present embodiment is silicon carbide, it is preferable that the silicon carbide particles have a mean particle size of 5 to 100 μm. The mean particle size in such a range has an advantage of easy control of the porosity and the pore size to be suitable for the filter. When the mean particle size is smaller than 5 μm, the pore size becomes too small. When it is larger than 100 μm, porosity becomes too high. When the pore size is too small, clogging is easily caused by the particulate matter (PM). When the porosity is too high, pressure loss may increase. The mean particle size of the raw material is a value measured according to JIS R 1629.

There is no particular limitation on a cell shape (cell shape in a cross section perpendicular to the central axial direction (cell extension direction) of a honeycomb structure) of the honeycomb segment constituting the honeycomb structure of the present embodiment, and there may be employed, for example, a triangle, a quadrangle, a hexagon, an octagon, a circle, or a combination thereof for each of the first cells and the second cells. Of these, as shown in FIGS. 2 and 3, it is preferable that the first cells 1a having a larger cross-sectional area are octagonal and that the second cells 1b having a smaller cross-sectional area are quadrangular. In addition, it is also preferable that the first cells have a quadrangular shape with the corner portions having a round R shape and that the second cells have a quadrangular shape.

In addition, in the honeycomb structure 100 of the present embodiment, in a cross section perpendicular to the central axis, the width W1 of the first cell (see FIG. 3) is preferably 0.8 to 3 mm. In addition, the width W2 of the second cell (see FIG. 3) is preferably 0.7 to 2.8 mm.

In addition, the thickness t1 of the partition wall (partition wall thickness) located between the first cells and the second cells (see FIG. 3) is preferably not larger than the thickness t2 of the slanted partition wall (see FIG. 3), more preferably smaller than t2. As shown in FIG. 3, the "slanted partition wall" means a partition wall extending in the slanted direction with respect to the direction where the first cells and the second cells are alternately aligned in a cross section perpendicular to the central axis of the honeycomb structure 100 and partition wall located on the extension of a diagonal line and extending in the direction of the diagonal line. In the honeycomb structure shown in FIG. 3, the slanted partition wall extends in the direction with an angle of inclination of 45° with respect to the direction where the first cells and the second cells are aligned. The partition wall thickness t1 is preferably 0.075 to 1.5 mm. In addition, the thickness t2 of the slanted partition walls is preferably 0.09 to 1.6 mm.

In addition, though there is no particular limitation on the cell density of the honeycomb segment, it is preferably 0.9 to 311 cells/cm$^2$, more preferably 7.8 to 62 cells/cm$^2$.

In the honeycomb structure of the present embodiment, the cross-sectional area of the first cell is larger than that of the second cell. Here, the "cross-sectional area of the first cell" or the "cross-sectional area of the second cell" means the "cross-sectional area in across section perpendicular to the central axial direction (cell extension direction) of a honeycomb structure" in each cell. In addition, by allowing exhaust gas to flow in from the open end portion side of the first cells (one end portion side), to pass through the partition wall, and to be discharged from the open end portion side (the other end portion side) of the second cells, particulate matter in the exhaust gas can be trapped on the surface of the partition walls having a large surface area inside the first cells. Therefore, clogging of the cells on the inflow side due to particulate matter can be inhibited. In the honeycomb segment constituting the honeycomb structure of the present embodiment, the cross-sectional area of the first cells is preferably 120 to 300%, more preferably 140 to 250% with respect to the cross-sectional area of the second cells. When the cross-sectional area of the first cell is smaller than 120% of the cross-sectional area of the second cell, the effect in inhibiting clogging of the inflow side cells (first cells) may be deteriorated. When the cross-sectional area of the first cell is larger than 300% of the cross-sectional area of the second cell, pressure loss may increase because the cross sectional-area of the outflow side cells (second cells) is small.

In addition, in a cross sect ion perpendicular to the central axial direction of the honeycomb structure of the present embodiment, the number of the honeycomb segments disposed is preferably 4 to 144, more preferably 16 to 100. As the size of the honeycomb segment, the cross-sectional area perpendicular to the central axis is preferably 3 to 16 $cm^2$, more preferably 7 to 13 $cm^2$. When it is smaller than 3 $cm^2$, pressure loss when gas passes through the honeycomb structure may increase. When it is larger than 16 $cm^2$, the effect in inhibiting fracture of the honeycomb segment may be deteriorated.

As shown in FIGS. 1 and 2, the honeycomb structure of the present embodiment has plugging portions in end portions on one side of the second cells and in the end portions on the other side of the first cells of the honeycomb segment 4, and the first cells and the second cells are alternately disposed in such a manner that the end faces of the honeycomb segment 4 show a checkerwise pattern.

There is no particular limitation on the whole shape of the honeycomb structure of the present embodiment, and a desired shape such as a circular cylindrical shape or an oval shape may be employed. In addition, as the size of the honeycomb structure, in the case of a circular cylindrical shape, the bottom face has a diameter of preferably 50 to 450 mm, more preferably 100 to 350 mm. In addition, a length in the central axial direction of the honeycomb structure is preferably 50 to 450 mm, and more preferably 100 to 350 mm.

Next, a method for manufacturing an embodiment of a honeycomb structure of the present invention will be described.

(1) Manufacturing of Honeycomb Segment:

In the first place, to a ceramic raw material are added a binder, a surfactant, a pore former, water, and the like to obtain a forming raw material. The ceramic raw material is preferably at least one kind selected from the group consisting of silicon carbide, a silicon-silicon carbide based composite material, cordierite, mullite, alumina, spinel, a silicon carbide-cordierite based composite material, lithium aluminum silicate, aluminum titanate, and an iron-chrome-aluminum alloy. Of these, silicon carbide and a silicon-silicon carbide based composite material are preferable. In the case of using a silicon-silicon carbide based composite material, a mixture of a silicon carbide powder and a metal silicon powder is used as the ceramic raw material.

As the binder, there can be employed methyl cellulose, hydroxypropoxyl cellulose, hydroxyethyl cellulose, carboxymethyl cellulose, polyvinyl alcohol, or the like. Of these, it is preferable to use methyl cellulose and hydroxypropoxyl cellulose together.

As the surfactant, ethylene glycol, dextrin, fatty acid soap, polyalcohol, or the like can be used. These may be used alone or in combination of two or more.

There is no particular limitation on the pore former as long as it forms pores after firing, and, for example, starch, a resin balloon, water-absorbing resin, silica gel, or the like may be employed.

Next, the forming raw material and water are kneaded to form kneaded clay. There is no particular limitation on the method for forming kneaded clay by kneading the forming raw material, and, for example, a method using a kneader or a vacuum kneader can be employed.

Figure 4:
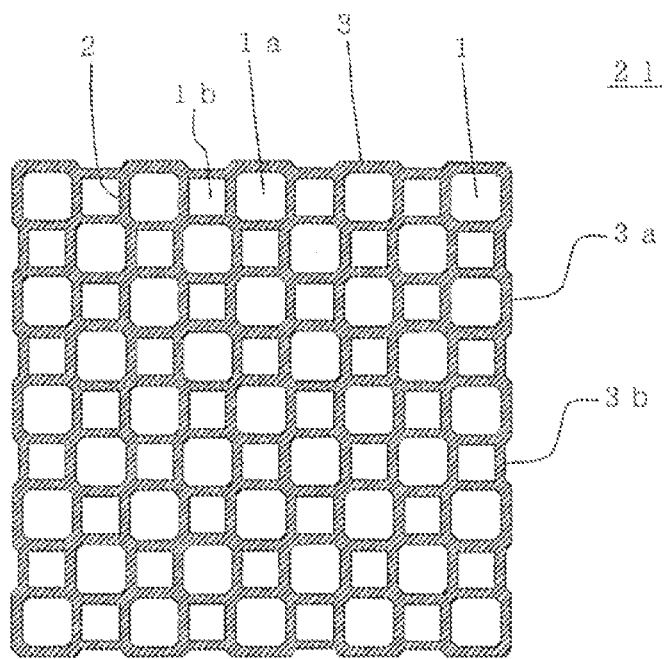
FIG. 4 is a schematic view showing a cross section perpendicular to a central axial direction of a columnar honeycomb formed article manufactured in the production process in a method for manufacturing an embodiment of a honeycomb structure of the present invention.

Next, the kneaded clay is subjected to extrusion forming to obtain a plurality of honeycomb formed articles 21 as shown in FIG. 4. Incidentally, it is preferable to form the honeycomb formed article. 31 shown in FIG. 5 or the honeycomb formed article 41 shown in FIG. 7 in accordance with the structure of the outer peripheral wall of the honeycomb segment to be manufactured. Upon extrusion forming, there is preferably used a die having desired segment shape, disposition of the segment, cell shape, partition wall thickness, cell density, and the like. As the material for the die, a superhard alloy hardly abrading away can preferably be used. The honeycomb formed article 21 has the porous partition walls 2 separating and forming a plurality of cells 1 functioning as fluid passages and the outer peripheral walls 3 located in the outermost periphery. In a cross section perpendicular to the central axial direction, the first cells 1a having a large area and the second cells 1b having a small area are alternately disposed, and the outer peripheral wall 3 has protruding portions 3a along the external shape of the first cells 1a and depressed portions 3b along the external shape of the second cells 1b. FIG. 4 is a schematic view showing a cross section perpendicular to a central axial direction of a columnar honeycomb formed article manufactured in the production process in a method for manufacturing an embodiment of a honeycomb structure of the present invention.

The partition wall thickness, cell density, thickness of outer peripheral wall, and the like of the honeycomb formed article 21 can appropriately be determined in accordance with the structure of the honeycomb structure of the present invention to be manufactured in consideration of shrinkage by drying and firing.

It is preferable that the obtained honeycomb formed article is dried before firing. There is no particular limitation on the method for drying, and there may be employed, for example, an electromagnetic wave heating method such as microwave heat-drying and high frequency dielectric heat-drying or an external heating method such as hot air drying and superheated steam drying. Of these, in that the whole formed article can be dried quickly and uniformly without causing a crack, it is preferable that, after drying a certain amount of water by an electromagnetic wave heating method, the remaining water is dried by an external heating method. As the drying conditions, it is preferable that, after removing water of 30 to 90 mass % with respect to the water content before drying by an electromagnetic wave heating method, water content is reduced to 3 mass % or less by an external heating method. A dielectric heat-drying is preferable in the case of an electromagnetic wave heating method, and hot air drying is preferable in the case of an external heating method.

Next, in the case that the honeycomb formed article does not have desired length in the central axial direction, both the end portions are cut away to obtain the desired length. Though there is no particular limitation on the method for cutting, a method using a circular sawing machine or the like may be employed.

Next, it is preferable that the honeycomb formed article 21 is fired to obtain a honeycomb fired article. Before firing, in order to remove the binder or the like, calcination is preferably performed. The calcination is preferably performed at 400 to 500'C for 0.5 to 20 hours in an ambient atmosphere. There is no particular limitation on the method for the calcination and firing, and the firing can be performed by the use of an electric furnace, a gas furnace, or the like. Preferable conditions are 1300 to 1500° C. for 1 to 20 hours in an inert atmosphere such as nitrogen, argon, or the like.

Next, plugging is preferably performed in the end portions on one side of the second cells having smaller area in a cross section perpendicular to the central axis and the end portions on the other side of the first cells having a larger area in a cross section perpendicular to the central axis of the honeycomb fired article (plugging portions are formed) to obtain a honeycomb segment. There is no particular limitation on the method for plugging, and, for example, the following method can be employed. After applying a sheet on one side end face of the honeycomb fired article, holes are made in positions corresponding with the cells (the second cells) to be plugged of the sheet. Then, the end face having the sheet applied thereon of the honeycomb fired article is immersed in plugging slurry obtained by slurrying the constituent material for plugging portions to fill the plugging slurry in the open end portions of the cells (second cells) to be plugged through the holes made in the sheet. Regarding the other side end face of the honeycomb fired article, plugging is performed (the plugging slurry is filled) in the cells (first cells) having no plugging on the one side end face in the same method as in the method for performing plugging on the aforementioned one side end face. As the constituent material for plugging portions, it is preferable to use the same material as that for the honeycomb formed article. It is preferable that firing is performed in the same conditions as the aforementioned firing conditions after the plugging portions are formed. The forming of the plugging portions may be performed before firing the honeycomb formed article.

(2) Manufacturing of Honeycomb Structure:

A predetermined number of honeycomb segments are bonded together with bonding material to form a honeycomb segment bonded article where the honeycomb segments are disposed in such a manner that the side faces face each other and that the side faces are bonded to each other with a bonding member. The honeycomb segment bonded article may be used as the honeycomb structure finally obtained. The bonding member is preferably disposed over the whole side faces facing each other. The bonding member plays a role of buffering (absorbing) the volume change upon thermal expansion or thermal shrinkage of the honeycomb segments and a role of bonding the honeycomb segments.

As the bonding material, there may be used slurry or the like obtained by adding additives such as an organic binder, a resin balloon, and a dispersant to an inorganic raw material such as inorganic fibers, colloidal silica, clay, SiC particles, and further adding water, followed by kneading.

After the honeycomb segment bonded article is formed, it is possible that the outer peripheral portion is ground to obtain a desired shape. For example, in the case of manufacturing the honeycomb structure 100 shown in FIG. 1, 16 quadrangular prism honeycomb segments 4 are bonded together to obtain a honeycomb segment bonded article, the outer periphery of the honeycomb segment bonded article is ground to obtain a circular columnar honeycomb segment bonded article, and the outer peripheral portion 12 is disposed to obtain a honeycomb structure 100.

It is preferable that, after the honeycomb segment bonded article is formed, the outer peripheral coat treatment is performed to dispose the outer peripheral portion 12 in the outermost periphery of the honeycomb segment bonded article. As the outer peripheral coat treatment, there may be employed a method where ah outer peripheral coat material is applied on the outermost periphery of the honeycomb segment bonded article, followed by drying. As the outer peripheral coat material, there may be used a mixture of inorganic fibers, colloidal silica, clay, SiC particles, an organic binder, a resin balloon, a dispersant, and water. The content of each of the raw materials is within the same range as that of the content of each of the raw materials for the aforementioned bonding material. There is no particular limitation on the method for applying the outer periphery coat material, and there may be employed a method where the material is coated by the use of a rubber spatula with rotating a honeycomb bonded article on a potter's wheel.

EXAMPLES

Hereinbelow, the present invention will be described more specifically with referring to Examples. However, the present invention is by no means limited to these Examples.

Example 1

As the ceramic raw material, a SiC powder and a metal Si powder were mixed at a mass ratio of 80:20, and to the mixture were added methyl cellulose and hydroxypropoxy methyl cellulose as forming auxiliaries, starch and water-absorbing resin as pore formers, a surfactant, and water, followed by kneading with a vacuum kneader to obtain kneaded clay having a quadrangular prism shape by the use of a vacuum kneader.

The kneaded clay having a quadrangular prism shape obtained above was formed, by the use of an extrusion-forming machine, into a honeycomb formed article, as shown in FIG. 4, having a structure having porous partition walls 2 separating and forming a plurality of cells 1 and the outer peripheral walls 3 located in the outermost periphery thereof, the first cells 1a having a large area and the second cells 1b having a small area in a cross section perpendicular to the central axial direction being alternately disposed, the outer peripheral walls 3 each having protruding portions 3a and depressed portions 3b alternately aligned. The honeycomb formed article was subjected to high frequency dielectric heat-drying and the subsequent drying at 120° C. for 2 hours by the use of a hot air drier, followed by cutting both the end faces at a predetermined amount.

The honeycomb formed article was dried at 120° C. for five hours by the use of a hot air drier, degreased at about 450° C. for five hours by the use of an atmospheric furnace with a deodorizer in an ambient atmosphere, and then fired at about 1450° C. for five hours in an Ar inert atmosphere to obtain a plugged porous honeycomb fired article where SiC crystal particles were bonded with Si. The honeycomb fired article had a mean pore size of 13 µm and a porosity of 41%. The mean pore size and the porosity were measured by a mercury porosimeter.

For the honeycomb fired article obtained above, plugging portions were formed in an end portion on one side of each of the second cells and the end portion on the other side of each of the first cells. As the filler for the plugging, the same material as for the honeycomb formed article was used. After the plugging portions were formed in the honeycomb fired article, the honeycomb fired article was fired under the same conditions as the aforementioned firing conditions to form a honeycomb segment. The honeycomb segment had a bottom face having an external shape size of 37.04 mm×37.04 mm and a length of 155 mm in the central axial direction. The cross-sectional area of the first cells having a large cross-sectional area in a cross section perpendicular to the central axial direction was 1.49 mm, and the cross-sectional area of the second cells having a small cross-sectional area in a cross section perpendicular to the central axial direction was 0.85 $mm^2$. In addition, the width W1 of the first cells was 1.24 mm, and the width W2 of the second cells was 0.92 mm. The partition wall thickness t1 was 0.38 mm, the partition wall thickness T1 of the protruding portions was 0.38 mm, and the partition wall thickness T2 of the depressed portions was 0.38 mm.

The honeycomb segments obtained above were bonded with a bonding material to have a disposition of 4×4 as in the honeycomb structure shown in FIG. 1 to obtain a honeycomb segment bonded article. As the bonding material, there was used a mixture of aluminosilicate inorganic fibers and SiC particles.

The outer periphery was subjected to coarse machining and grinding to obtain a desired circular cylindrical shape. The outer peripheral coat treatment was performed on the honeycomb segment bonded article obtained above to dispose the outer peripheral portion in the outermost periphery of the honeycomb segment bonded article. Thus, a honeycomb structure having a diameter of 148 mm was obtained. As the outer peripheral coat material, there was used a mixture of SiC particles, colloidal silica, and the like.

In the honeycomb structure obtained above, the height H (height H of protruding portion based on the depressed portion) of the outer peripheral wall was 0.16 mm. In addition, the "sum of height of the two protruding portions in adjacent honeycomb segments" was 0.32 mm. In addition, the "distance D1 between protruding portions" between two adjacent honeycomb segments was 0.3 mm, and the distance D2 between the depressed portions was 0.62 mm.

The honeycomb structure obtained above was evaluated for "isostatic strength", "hot vibration test", "regeneration limit", and "pressure loss" by the following methods. The results are shown in Table 1. In Table 1, regarding Examples 1 to 14 and Comparative Examples 2 and 3, the "isostatic strength", "regeneration limit", and "pressure loss" show increase or decrease with respect to Comparative Example 1 with employing the results of the Comparative Example 1 as the standards, and, regarding Examples 15 to 22 and Comparative Example 5, "isostatic strength", "regeneration limit", and "pressure loss" show increase or decrease with respect to Comparative Example 4 with employing the results of the Comparative Example 4 as the standards.

(Isostatic Strength)

Isostatic strength was measured according to the method for measuring isostatic fracture strength prescribed in JASO standard M505-87, which is an automotive standard issued by Society of Automotive Engineers of Japan.

(Hot Vibration Test)

With an inlet gas temperature of 900° C., a vibration acceleration of 50 G, a vibration frequency of 200 Hz, heated exhaust gas was allowed to flow into a honeycomb structure, and vibrations due to an electric vibrator were applied in an axial direction of the honeycomb structure. The evaluations were given as "excellent" in the case that the travel distance (creep distance) of the "honeycomb structure" after 300 hours is below 0.2 mm, "good" in the case of 0.2 to 0.4 mm, and "fair" in the case of 0.4 to 0.6 mm (excluding 0.4 mm). The case that travel distance of the abutting faces after 300 hours is 0.6 mm or less does not have a problem for practical use, it is preferably 0.4 mm or less.

(Regeneration Limit Value)

Using the honeycomb structure as a DPF, the soot deposition amount was gradually increased to perform regeneration (soot combustion) and confirm the limit where a crack generated. In the first place, a ceramic non-intumescent mat was wrapped around the outer periphery of the honeycomb structure obtained above as the holding material, and they were put in a can made of SUS409 to obtain a canning structure. Then, combustion gas containing soot generated by combustion of a diesel fuel (light oil) was allowed to flow into the honeycomb structure from an end face on one side end face and discharged from the other side end face of the honeycomb structure, thereby depositing the soot inside the honeycomb structure. After the honeycomb structure was cooled down to room temperature, combustion gas containing oxygen at a predetermined rate at 680° C. was allowed to flow into the honeycomb structure, and the combustion gas flow rate was reduced when the pressure loss of the honeycomb structure was lowered, thereby rapidly combusting soot. Then, the presence/absence of crack generation in the plugged honeycomb structure was confirmed. This test was started when the soot deposition amount was 4 g per 1 liter (hereinbelow referred to as 4 g/liter or the like) of the capacity of the honeycomb structure, and the soot deposition amount was increased by 0.5 (g/liter) until crack generation was confirmed, which was repeated. The measurement results of the regeneration limit values shown in Table 1 show the values based on the measurement results of the honeycomb structure of Comparative Example 1. That is, the values were obtained by deducting the measurement result of the regeneration value (g/liter) regarding the honeycomb structure of Comparative Example 1 from the measurement results (average value of measurement of 5 (N=5) honeycomb structures in each Example) of the regeneration limit value (soot amount when the initial crack generated) (g/liter) in the honeycomb structures in each Example.

(Pressure Loss)

Pressure loss of a honeycomb structure was measured by the use of a "pressure loss measurement apparatus for a filter" described in JP-A-2005-172652. As the measurement conditions, the fluid flow rate was 10 $Nm^3$/min., and the fluid (air) temperature in the experiment was 25° C. Incidentally, increase of pressure loss within 5% is not a problem for practical use. However, it is more desirable to have smaller pressure loss.

TABLE 1

| | W1 (mm) | W2 (mm) | H (mm) | D1 (mm) | D2 (mm) | t1 (mm) | T1 (mm) | T2 (mm) | Isostatic strength | Hot vibration test | Regeneration limit value (g/liter) | Pressure loss (%) |
|---|---|---|---|---|---|---|---|---|---|---|---|---|
| Example 1 | 1.24 | 0.92 | 0.160 | 0.3 | 0.62 | 0.38 | 0.38 | 0.38 | 0 | Excellent | +0.1 | −2 |
| Example 2 | 1.24 | 0.92 | 0.080 | 0.1 | 0.26 | 0.38 | 0.30 | 0.38 | 0 | Good | +0.1 | −3 |
| Example 3 | 1.24 | 0.92 | 0.180 | 0.1 | 0.46 | 0.38 | 0.40 | 0.38 | 0 | Excellent | +0.1 | −3 |

TABLE 1-continued

|  | W1 (mm) | W2 (mm) | H (mm) | D1 (mm) | D2 (mm) | t1 (mm) | T1 (mm) | T2 (mm) | Isostatic strength | Hot vibration test | Regeneration limit value (g/liter) | Pressure loss (%) |
| --- | --- | --- | --- | --- | --- | --- | --- | --- | --- | --- | --- | --- |
| Example 4 | 1.24 | 0.92 | 0.580 | 0.2 | 1.36 | 0.38 | 0.80 | 0.38 | 0 | Excellent | +0.2 | 0 |
| Example 5 | 1.24 | 0.92 | 0.780 | 0.4 | 1.96 | 0.38 | 1.00 | 0.38 | 0 | Excellent | +0.3 | +2 |
| Example 6 | 1.24 | 0.92 | 1.000 | 2.2 | 4.20 | 0.38 | 1.22 | 0.38 | 0 | Excellent | +0.5 | +4 |
| Example 7 | 1.24 | 0.92 | 1.080 | 1.0 | 3.16 | 0.38 | 1.30 | 0.38 | 0 | Excellent | +0.5 | +3 |
| Example 8 | 1.24 | 0.92 | 0.090 | 1.2 | 1.38 | 0.38 | 0.38 | 0.45 | 0 | Good | +0.2 | +2 |
| Example 9 | 1.24 | 0.92 | 0.240 | 0.5 | 0.98 | 0.38 | 0.38 | 0.30 | 0 | Excellent | +0.1 | 0 |
| Example 10 | 1.24 | 0.92 | 0.340 | 1.0 | 1.68 | 0.38 | 0.38 | 0.20 | 0 | Excellent | +0.2 | +1 |
| Example 11 | 1.24 | 0.92 | 0.160 | 0.8 | 1.12 | 0.38 | 0.20 | 0.20 | 0 | Excellent | +0.1 | 0 |
| Example 12 | 1.24 | 0.92 | 0.960 | 0.8 | 2.72 | 0.38 | 1.00 | 0.20 | 0 | Excellent | +0.2 | +2 |
| Example 13 | 1.24 | 0.92 | 0.160 | 0.3 | 0.62 | 0.38 | 0.38 | 0.38 | 0 | Excellent | +0.1 | −2 |
| Example 14 | 1.24 | 0.92 | 0.580 | 0.2 | 1.36 | 0.38 | 0.80 | 0.38 | 0 | Excellent | +0.2 | 0 |
| Example 15 | 1.26 | 0.95 | 0.105 | 0.3 | 0.51 | 0.25 | 0.20 | 0.25 | 0 | Excellent | +0.1 | −3 |
| Example 16 | 1.26 | 0.95 | 0.905 | 0.3 | 2.11 | 0.25 | 1.00 | 0.25 | 0 | Excellent | +0.2 | 0 |
| Example 17 | 1.26 | 0.95 | 1.305 | 0.3 | 2.91 | 0.25 | 1.40 | 0.25 | 0 | Excellent | +0.3 | +1 |
| Example 18 | 1.26 | 0.95 | 0.155 | 0.3 | 0.61 | 0.25 | 0.20 | 0.20 | 0 | Excellent | +0.1 | −2 |
| Example 19 | 1.26 | 0.95 | 0.955 | 0.3 | 2.21 | 0.25 | 1.00 | 0.20 | 0 | Excellent | +0.2 | +1 |
| Example 20 | 1.26 | 0.95 | 1.355 | 0.3 | 3.01 | 0.25 | 1.40 | 0.20 | 0 | Excellent | +0.3 | +2 |
| Example 21 | 1.26 | 0.95 | 0.105 | 0.3 | 0.51 | 0.25 | 0.20 | 0.25 | 0 | Excellent | +0.1 | −3 |
| Example 22 | 1.26 | 0.95 | 0.955 | 0.3 | 2.21 | 0.25 | 1.00 | 0.20 | 0 | Excellent | +0.2 | +1 |
| Comp. Ex. 1 | 1.24 | 0.92 | 0.000 | 0.5 | 0.50 | 0.38 | 0.38 | 0.38 | — | Fair | — | — |
| Comp. Ex. 2 | 1.24 | 0.92 | 0.000 | 1.6 | 1.60 | 0.38 | 0.30 | 0.30 | 0 | Fair | −0.1 | +2 |
| Comp. Ex. 3 | 1.24 | 0.92 | 0.000 | 3.0 | 3.00 | 0.38 | 0.20 | 0.20 | 0 | Fair | −0.2 | +3 |
| Comp. Ex. 4 | 1.26 | 0.95 | 0.000 | 0.2 | 0.20 | 0.25 | 0.25 | 0.25 | — | Fair | — | — |
| Comp. Ex. 5 | 1.26 | 0.95 | 0.000 | 1.7 | 1.70 | 0.25 | 0.20 | 0.20 | 0 | Fair | −0.1 | +1 |

Examples 2 to 12 and 15 to 20

Honeycomb structures were manufactured in the same manner as in Example 1 except that the width W1 of the first cells, width W2 of the second cells, partition wall thickness t1, partition wall thickness T1 of the protruding portions, partition wall thickness T2 of the depressed portions, height H of the protruding portions of the outer peripheral wall, distance D1 between protruding portions, and distance D2 between depressed portions were changed as shown in Table 1. The evaluations for "isostatic strength", "hot vibration test", "regeneration limit value", and "pressure loss" were given in the same manner as in Example 1. The results are shown in Table 1. Incidentally, the number of cells was selected in such a manner that each of the honeycomb segments had a bottom face having an external shape size of about 37 mm×37 mm (measured at protruding portions).

Examples 13, 14, 21 and 22

Figure 5:
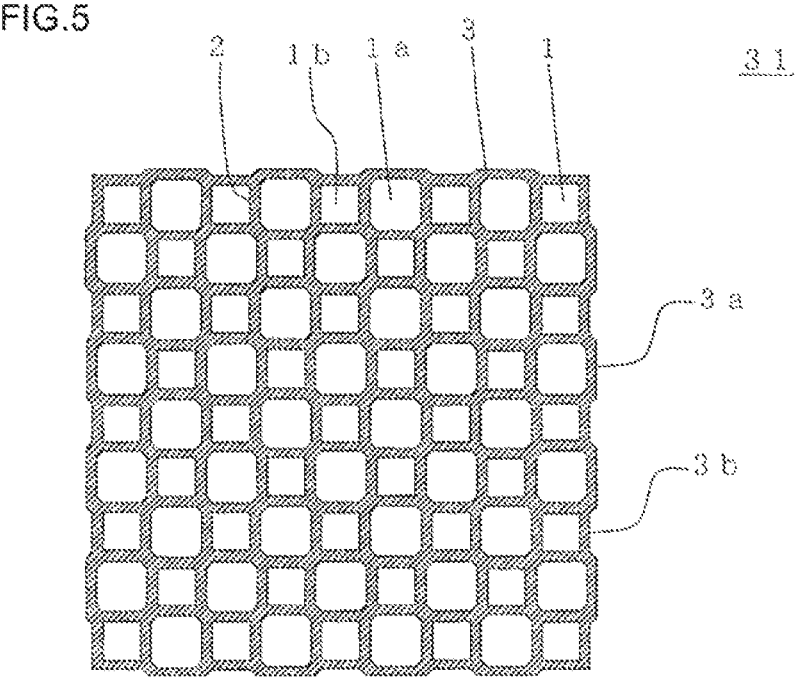
FIG. 5 is a schematic view showing a cross section perpendicular to a central axial direction of a columnar honeycomb formed article manufactured in the production process of a honeycomb structure in an Example.
Figure 6:
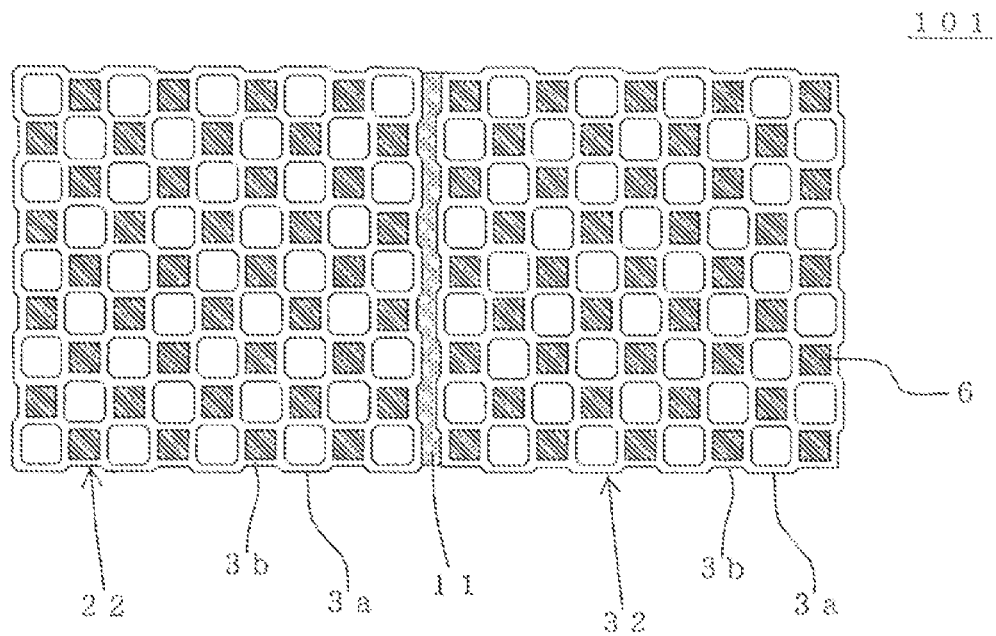
FIG. 6 is a plan view schematically showing a part of one end face of a honeycomb structure manufactured in an Example.

Honeycomb structures were manufactured in the same manner as in Example 1 except that the honeycomb formed article 21 having the first cell 1a in each of the corner portions as shown in FIG. 4 and the honeycomb formed article 31 having the second cell 1b in each of the corner portions as shown in FIG. 5 were manufactured, that the honeycomb segment 22 formed of the honeycomb formed article 21 and the honeycomb segment 32 formed of the honeycomb formed article 31 were bonded together in such a manner that side faces of the honeycomb segments face each other as shown in FIG. 6, and that the width W1 of the first cell, width W2 of the second cell, partition wall thickness t1, partition wall thickness T1 of the protruding portions, partition wall thickness T2 of the depress ion portions, height H of the protruding portions of the outer peripheral wall, distance D1 between protruding portions, and distance D2 between depressed portions were changed as shown in Table 1. FIG. 5 is a schematic view showing a cross section perpendicular to a central axial direction of a columnar honeycomb formed article manufactured in the production process of a honeycomb structure in an Example (Example 13), and FIG. 6 is a plan view schematically showing a part of one end face of a honeycomb structure 101 manufactured in an Example (Example 13). The honeycomb structures obtained were evaluated for "isostatic strength", "hot vibration test", "regeneration limit value", and "pressure loss" were given in the same manner as in Example 1. The results are shown in Table 1.

Incidentally, the number of cells was selected in such a manner that each of the honeycomb segments had a bottom face having an external shape size of about 37 mm×37 mm (measured at protruding portions).

Honeycomb structures were manufactured in the same manner as in Example 1 except that the outer peripheral walls (H=0) of the honeycomb segments in a cross section perpendicular to the central axial direction were linearly formed without forming protruding portions and depressed portions on the outer peripheral walls and that the width W1 of the first cell, width W2 of the second cell, and partition wall thickness t1, partition wall thickness T1 of the protruding portions, partition wall thickness T2 of the depression portions, height H of the protruding portions of the outer peripheral wall, distance D1 between protruding portions, and distance D2 between depressed portions were changed as shown in Table 1. Incidentally, since neither protruding portions nor depressed portions were formed on the outer peripheral walls of the honeycomb segments, T1 and T2 do not show partition wall thickness of protruding portions and depressed portions but show the thickness of the outer peripheral wall having a uniform thickness. Therefore, T1 and T2 show the same values. The honeycomb structures obtained were evaluated for "isostatic strength", "hot vibration test", "regeneration limit value", and "pressure loss" were given in the same manner as in Example 1. The results are shown in Table 1. Incidentally, the number of cells was selected in such a manner that each of the honeycomb segments had a bottom face having an external shape size of about 37 mm×37 mm (measured at protruding portions).

From Table 1, it can be understood that the honeycomb structures of Examples 1 to 22 showed good results of evaluations for isostatic strength, hot vibration test, regeneration limit value, and pressure loss. In particular, good results were shown in the evaluations for the hot vibration test and the regeneration limit value. In contrast, in honeycomb structures of Comparative Examples 1 to 4, it can be understood that the evaluation results of the hot vibration test and the regeneration limit value were bad since the outer peripheral walls have no protruding portions and depressed portions.

A method for manufacturing a honeycomb structure of the present invention can suitably be used as a carrier for a catalytic device or a filter used for an environmental measure, collection of a specific material or the like in various fields such as chemistry, electric power, and iron and steel.

What is claimed is:

1. A honeycomb structure comprising a plurality of honeycomb segments having porous partition walls separating and forming a plurality of cells functioning as fluid passages and an outer peripheral wall located in the outermost periphery, the cells including first cells each open in an end portion on one side and plugged in the other end portion on the other side and second cells each plugged in the end portion on the one side and open in the other end portion on the other side, and the first cells and the second cells being alternately disposed with the first cells having an area larger than that of the second cells in a cross section perpendicular to the central axial direction;

wherein the outer peripheral wall has protruding portions along an external shape of the first cells and depressed portions along an external shape of the second cells, the honeycomb segments are disposed with side faces thereof facing each other and bonded to each other with a bonding member at the side faces facing each other, and a distance between the depressed portions on adjacent side faces that are bonded to each other is equal to two times a height of the protruding portions plus a distance between the protruding portions of the adjacent side faces.

2. The honeycomb structure according to claim 1, wherein the protruding portions of the outer peripheral wall has a height of 0.1 to 1.0 mm based on the depressed portions of the outer peripheral wall.

3. The honeycomb structure according to claim 1, wherein, in a pair of side faces facing each other of adjacent honeycomb segments, the distance from the depressed portion of one of the side faces to the depressed portion of the other side face is 0.3 to 3.0 mm.

4. The honeycomb structure according to claim 2, wherein, in a pair of side faces facing each other of adjacent honeycomb segments, the distance from the depressed portion of one of the side faces to the depressed portion of the other side face is 0.3 to 3.0 mm.

* * * * *

UNITED STATES PATENT AND TRADEMARK OFFICE
CERTIFICATE OF CORRECTION

PATENT NO.         : 8,211,526 B2                           Page 1 of 1
APPLICATION NO.    : 12/711617
DATED              : July 3, 2012
INVENTOR(S)        : Koji Nagata and Toshio Yamada It is certified that error appears in the above-identified patent and that said Letters Patent is hereby corrected as shown below:

Title Page, Item (56), References Cited, Foreign Patent Documents:
*please change* "ER 1 884 275 2/2008" to --EP 1 884 275 2/2008-- and
"ET 1 977 808 10/2008" to --EP 1 977 808 10/2008--

Signed and Sealed this
Fourth Day of September, 2012

David J. Kappos
*Director of the United States Patent and Trademark Office*